United States Patent
Ikuta et al.

Patent Number: 6,105,891
Date of Patent: Aug. 22, 2000

[54] HANDLE ASSEMBLY FOR FISHING REEL

[75] Inventors: Takeshi Ikuta; Jun Sato, both of Sakai, Japan

[73] Assignee: Shimano, Inc., Japan

[21] Appl. No.: 09/203,708

[22] Filed: Dec. 2, 1998

[30] Foreign Application Priority Data

Dec. 4, 1997 [JP] Japan ................................. 9-334050
Nov. 6, 1998 [JP] Japan ................................. 10-316499

[51] Int. Cl.$^7$ ................................................ A01K 89/00
[52] U.S. Cl. ............................................................ 242/283
[58] Field of Search ............................................... 242/283

[56] References Cited

U.S. PATENT DOCUMENTS

| | | |
|---|---|---|
| 2,335,752 | 11/1943 | Geiger . |
| 2,774,545 | 12/1956 | Chambers ................................. 242/283 |
| 3,215,360 | 11/1965 | Chambers ................................. 242/283 |
| 3,250,489 | 5/1966 | Hiromitsu ................................. 242/283 |
| 3,375,993 | 4/1968 | Hayes . |
| 3,727,857 | 4/1973 | Chann ................................. 242/283 |
| 5,328,128 | 7/1994 | Morris ................................. 242/283 |
| 5,433,394 | 7/1995 | Brozio ................................. 242/283 |
| 5,660,344 | 8/1997 | Testa ................................. 242/283 |

*Primary Examiner*—Katherine A. Matecki
*Attorney, Agent, or Firm*—Jeffer, Mangels, Butler & Marmaro LLP

[57] ABSTRACT

A handle assembly for a fishing reel includes a crank arm and a handle grip. The handle grip includes a linking member and a knob member having a smooth outer surface. The knob member defines first, second and third axes that are mutually perpendicular and meet at a point of intersection, and has a cross section in each plane perpendicular to the second axis that is bounded by at least a portion of a curve selected from the group consisting of a conic section and an oval. The portions define at least a portion of the smooth outer surface of the knob member. The cross sections decrease in area outward from the point of intersection along the second axis in either direction. The inventive handle assembly substantially conforms to the shape of a human palm, and enables a user to rapidly wind the knob member over an extended period of time without causing the user's hand to tire easily.

32 Claims, 9 Drawing Sheets

HANDLE ASSEMBLY FOR FISHING REEL

FIELD OF THE INVENTION

The present invention relates to a handle assembly of a fishing reel, and in particular to a fishing reel handle assembly positioned at the distal end of the handle shaft of the fishing reel.

BACKGROUND OF THE INVENTION

Handle assemblies are fixed at the distal end of the handle shaft of fishing reels, such as spinning reels, double bearing reels and single bearing reels and the like. The so-called T-shaped handle assembly is often used as the handle assembly for this type of reel. This handle assembly has a crank arm fixed to the distal end of the handle shaft of the reel, a knob member support shaft fixed to the distal end of the crank arm, and a handle grip attached rotatably to the knob member support shaft. The handle grip has a tubular handle shaft rotatably supported by the knob member support shaft, and a cylindrical knob member fixed in a T-shaped pattern to the grip shaft. The knob member support shaft is disposed parallel to the handle shaft, and the grip shaft is disposed to the outside of the knob member support shaft.

Fishing reels equipped with this type of handle assembly are sometimes used in a form of deep-sea fishing, called vertical jigging. Vertical jigging is a fishing method in which a heavy lure called a jig is reeled in rapidly and close to vertically. During vertical jigging, the grip section of the fishing rod is held between, for example, the left arm and side; the fishing rod and reel is held in the left hand; the left hand jerks the fishing rod while the right hand grips the knob member and repeats the action of rapidly rotating the handle assembly.

In vertical jigging, the action of winding the line and jerking the fishing rod is repeated at high speed. For this reason, it is necessary to be able to rotate the handle assembly with force, and for the design to facilitate high-speed rotation. The knob member must furthermore be designed so that the action of forcefully reeling in at high speed all day will not tire out the hand easily.

However, because the knob member of the aforementioned conventional T-shaped handle assembly is cylindrical in shape, when gripped a gap is left between it and the palm; so that unless the knob member is gripped tightly, it is not possible to rotate the handle assembly with force. Gripping the knob member tightly causes the wrist to clench as well, and it becomes difficult to rotate the handle assembly at high speed. Therefore, the repeated action of rapidly winding the knob member over an extended period of time causes the hand to tire.

A need exists for a handle assembly for a fishing reel which will not cause the hand to tire easily from the repeated action of rapidly winding the knob member over an extended period of time.

SUMMARY OF THE PREFERRED EMBODIMENTS

In accordance with one aspect of the present invention, there is provided a handle assembly adapted to be attached to the distal end of the handle shaft. The handle assembly includes a crank arm and a handle grip. The crank arm is nonrotatably attachable to the distal end of the handle shaft, and extends outwardly from the handle shaft. The crank arm has a distal end. The handle grip has an outer surface and includes a linking member and a knob member. The linking member is connected to the distal end of the crank arm and is mounted rotatably about a first axis that is parallel to the handle shaft. The linking member projects along the first axis from the distal end of the crank arm, and has a basal end and a distal end. The knob member has a substantially circular cross section and extends from the distal end of the linking member in both directions along a second axis that intersects the first axis and is perpendicular to the handle shaft. The substantially circular cross section of the knob member decreases in radial size measured from the second axis proceeding outward from the point of intersection of the first and second axes. The length A of the knob member from the point of intersection along the first axis in the direction away from the crank arm is greater than the length B from the point of intersection along the first axis in the direction towards the crank arm. The lengths C of the knob member from the point of intersection in each direction along a third axis that intersects and is perpendicular to the first axis and the second axis, are greater than the length B.

The shape of the section of the knob member of the handle grip of the inventive handle assembly is designed so that the radius of curvature of the outer side (farther away from the crank arm along the first axis and along the third axis which it intersects) is larger than the inner side (closer to the crank arm along the first axis), and narrows away from the center towards the two ends of the second axis, so that when it is gripped, the part of the knob member touching the palm fits the shape of the palm, and there is no force lost even if the knob member is gripped loosely. As a result, it is possible to rotate the handle assembly with force even when gripping it loosely, and the hand does not tire easily from long hours of repetitive high-speed knob member winding.

In a preferred embodiment, the knob member has an outer side portion having a contour that is arcuate in shape, having a radius (R) centered on the first axis (close to the basal end of the linking member) and extending in the plane defined by the first and second axes. In this case, the knob member is more easily gripped by the palm, because the contour of the outer side of the knob member is arcuate.

In another preferred embodiment, the length L of the knob member along the second axis is about 40 mm to about 100 mm. In this case, the length L of the knob member facing the second axis, that is to say, the longitudinal distance of the knob member, matches the width of the typical human palm, so that force can be efficiently delivered to the knob member.

According to another preferred embodiment, the sum of the length A and the length B of the knob member is about 50% to about 90% of the length L. In this embodiment, the knob takes on an overall roundness of shape, so that no matter which direction the knob member is facing it is easy to grip instantaneously. In addition, it is an even closer fit for the palm, thus making it easy to apply force even when gripped loosely.

In another preferred embodiment, the value obtained by doubling the length C of the knob member is equal to about 50% to about 90% of the length L. In this embodiment, the diameter of the knob member facing the third axis increases, making it easier to grip forcefully.

Preferably, the linking member of the handle grip comprises a tubular section comprising 0% to about 70% of the overall length of the linking member, and continuing smoothly from the basal end through a flaring section, so that there are no boundaries between the knob member and the linking member when gripping the knob member, and it imparts a good sensation no matter where it is gripped.

Preferably, at least the outer surface of the knob member is covered with a soft, elastic sheath. In this embodiment, the knob member imparts a good sensation when gripped, and it prevents the hand from tiring easily.

In a preferred embodiment, the handle assembly further includes a knob member support member for rotatable mounting of the handle shaft to the crank arm.

In an additional preferred embodiment, the knob member support member includes a grip shaft and first and second bearings. The grip shaft is fixed at the basal end thereof to the distal end of the crank arm and extends along the first axis. The first bearing is disposed between the distal end of the grip shaft and an inner side of the knob member. The second bearing is disposed between the basal end of the grip shaft and the basal end of the linking member. In this embodiment, since the handle grip is supported by two bearings, the handle grip rotates smoothly even during high-speed rotation of the handle shaft by the handle grip, making high-speed take-up easy.

In accordance with another aspect of the present invention, there is provided a handle grip that includes a linking member and a knob member. The knob member has an outer surface that substantially conforms to the shape of a human palm.

According to a further aspect of the present invention, there is provided a handle grip that includes a linking member and a knob member. The knob member has a smooth outer surface and defines first, second and third mutually perpendicular axes that meet at a point of intersection. The knob member has a substantially circular cross section in each plane perpendicular to the second axis. The cross sections decrease in size outward from the point of intersection along the second axis in either direction.

According to still another aspect of the present invention, there is provided a handle grip including a linking member and a knob member. The linking member extends along a first axis. The knob member has a smooth outer surface, and defines second and third axes, the first, second and third axes being mutually perpendicular and meeting at a point of intersection. The knob member has a cross section in each plane perpendicular to the second axis that is bounded by at least a portion of a curve selected from the group consisting of a conic section and an oval, the portions defining at least a portion of the smooth outer surface of the knob. The cross sections decrease in area outward from the point of intersection along the second axis in either direction. The length A of the knob member from the point of intersection outward along the first axis is greater than the length B of the knob member from the point of intersection inward along the first axis.

In a preferred embodiment, the cross sections are substantially elliptical.

In a specific preferred embodiment, each cross section includes outer and inner half ellipses having a common major axis that extends along the third axis a length C from the point of intersection in either direction. The outer half ellipse has a semi-minor axis extending along the first axis a length A from the point of intersection, and the inner half ellipse has a semi-minor axis extending along the first axis a length B from the point of intersection. Preferably, length A is greater than length B. Also preferably, length C is greater than length B.

In alternative embodiments, the cross section is a semicircle, a half ellipse or a half oval, which can also have rounded ends.

In another alternative embodiment, the cross sections include an outer portion which is a semicircle or half ellipse, and an inner portion that is a triangle or trapezoid. In this embodiment as well, the ends of the cross section can be rounded.

In a further preferred embodiment, each cross section is substantially circular. At least one of the length A outward along the first axis from the point of intersection, the length B inward along the first axis from the point of intersection, and the lengths $C_1$ and $C_2$ along the third axis from the point of intersection in either direction is different from the remaining lengths.

Preferably, the cross sections are geometrically similar, that is, differ only by a scale factor.

In an additional preferred embodiment, each cross section includes at least one curved portion and at least one straight portion.

Handle assemblies including crank arms and the foregoing handle grips are also provided.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
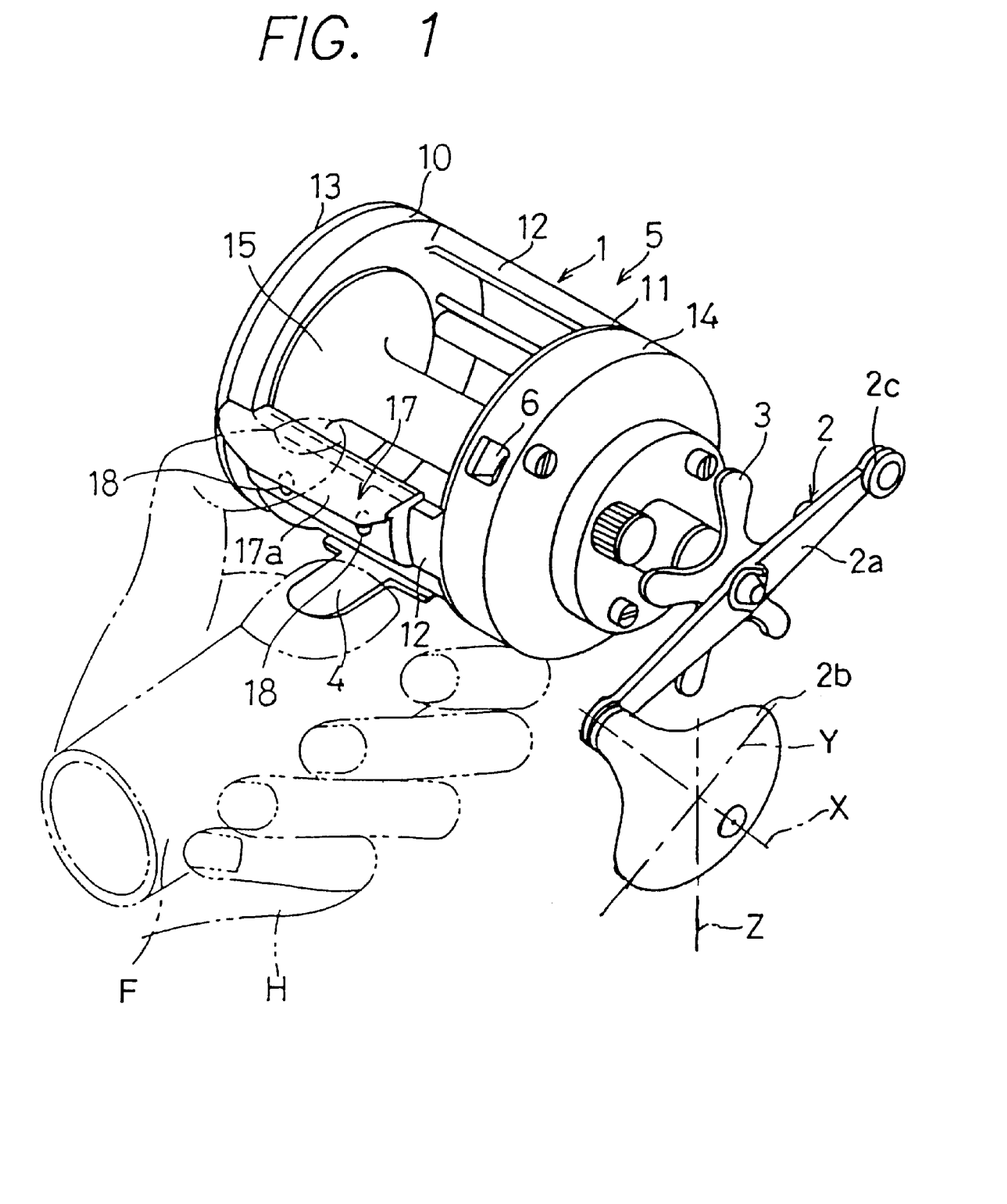
FIG. 1 is an oblique view of a double bearing reel according to a first embodiment of the present invention.

The exemplary double-bearing reel of FIG. 1 used in the first embodiment of the present invention is a round, mid-sized reel with a 300 meter take-up of, for example, No. 5 fishing line. This round reel comprises a reel body 1, a handle assembly 2 for spooling disposed on the side of the reel body 1, and a star drag 3 disposed on the reel body 1 next to the handle assembly 2. The reel body 1 can be attached to the fishing rod F via the reel attaching foot 4.

Figure 2:
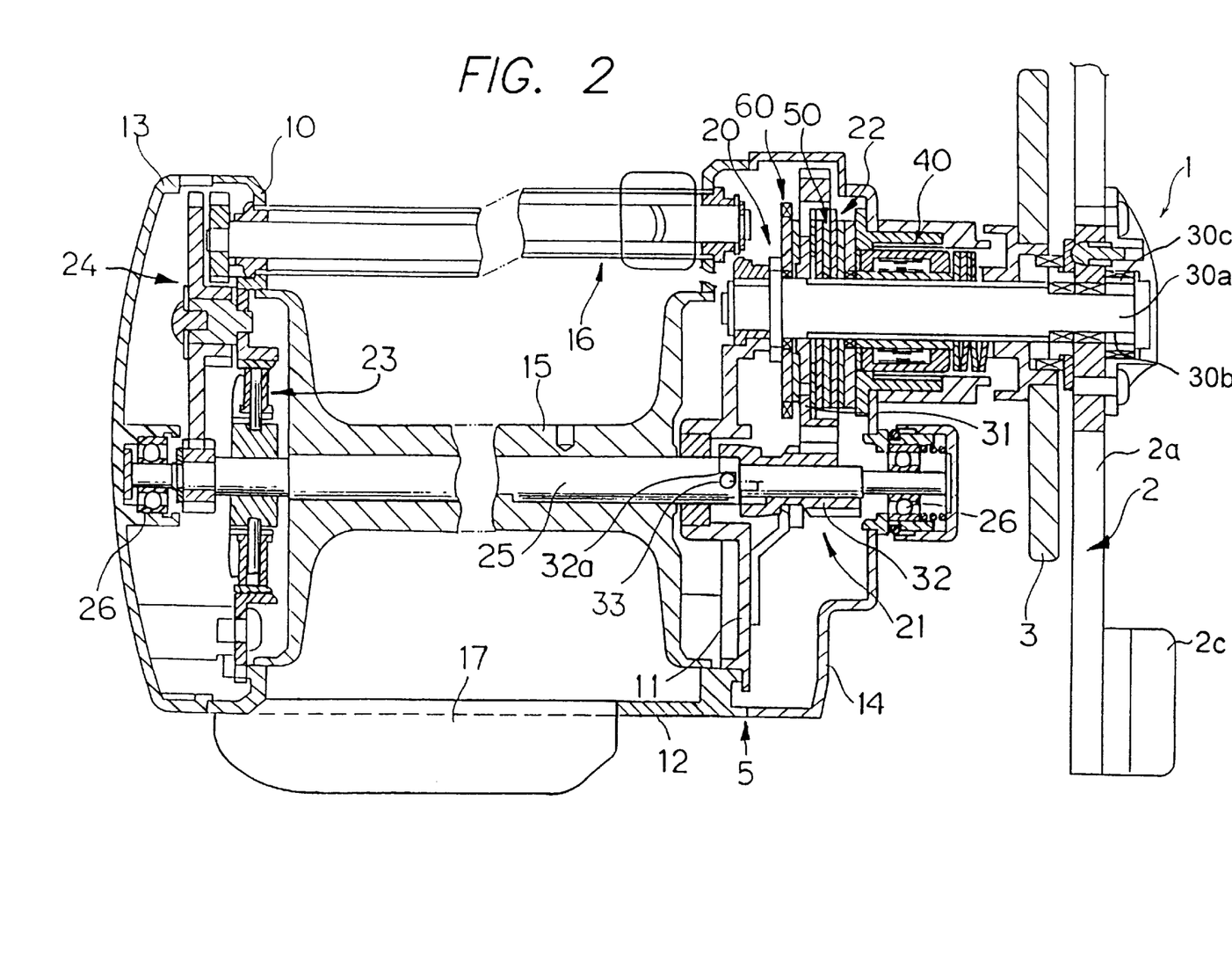
FIG. 2 is a cross section frontal view of the embodiment of FIG. 1.

As shown in FIG. 2, the reel body 1 comprises a frame 5 having a pair of left and right side plates 10 and 11 disposed a specific distance apart, as well as a plurality of linking elements 12 linking the side plates 10 and 11. First cover 13 and second cover 14 are attached to either side of the frame 5. The frame 5, first cover 13 and second cover 14 preferably are all metal components, whose surfaces have been formed by cutting; however, other materials and manufacturing methods can also be employed. The pair of side plates 10 and 11 and the two covers 13 and 14 are essentially circular when viewed from the side. The linking elements 12 are flat-shaped components formed integrally with both side plates 10 and 11, so as to follow the shape of the perimeter of the side plates 10 and 11, and, for example, link one pair of side plates 10 and 11 in three places at the back, bottom and top of the reel body 1. By linking the side plates 10 and 11 and the plurality of linking elements 12 in this way, there is little risk of deformation, such as bending and the like even when the reel body 1 is subjected to a significant load, and there is also little reduction in take-up efficiency.

A reel mounting foot 4 is attached to the lower linking element 12. A thumb rest 17, typically made of a synthetic resin material, is attached to the back linking element 12 so that the reel can be held along with the fishing rod F. As shown in FIG. 2, the thumb rest 17 is formed so that it touches the top and bottom of the linking element 12, and the back edge of the thumb rest extends radially outward, that is to say projects backward from the side plates 10 and 11. The back edge of the top face of 17a of the thumb rest 17 slants downward as it curves outwardly. In addition, the left edge (bottom of FIG. 2) and the right edge (top of FIG. 2) of the back edge of the top face 17a of the thumb rest 17 projects backward to a gradually decreasing extent as it inclines toward the left. The back panel of the thumb rest 17 preferably has a rectangular shape, where two attachment bolts 18 left and right are mounted therein with some distance between them. The thumb rest 17 is removably attached to the linking elements 12 by these attachment bolts 18.

By providing this thumb rest 17, the fishing rod F can be held reliably along with the reel during vertical jigging and the like, by placing, for instance, the thumb of the left hand H on the thumb rest 17, and clutching the fishing rod F and the reel with the other fingers.

As shown in FIG. 1 and FIG. 2, the handle assembly 2 comprises a crank arm 2a nonrotatably attached to the distal end 30a of the handle shaft 30. A handle grip 2b is rotatably attached about a first axis X, which is parallel to the handle shaft 30, to the end of the crank arm 2a. A balancing component 2c is attached to the other end of the crank arm 2a. Knob member support member 2d (FIG. 3) allows the handle grip 2b to be rotatably attached to the crank arm 2a.

The crank arm 2a in the illustrated embodiment is a flat bar-shaped metal component extending in the radial direction from the handle shaft 30, and as shown in FIG. 2, it is nonrotatably engaged by a chamfered section 30b formed at the distal end of the handle shaft 30, and is removably attached to the handle shaft 30 by a fixing nut 30c.

Figure 3:
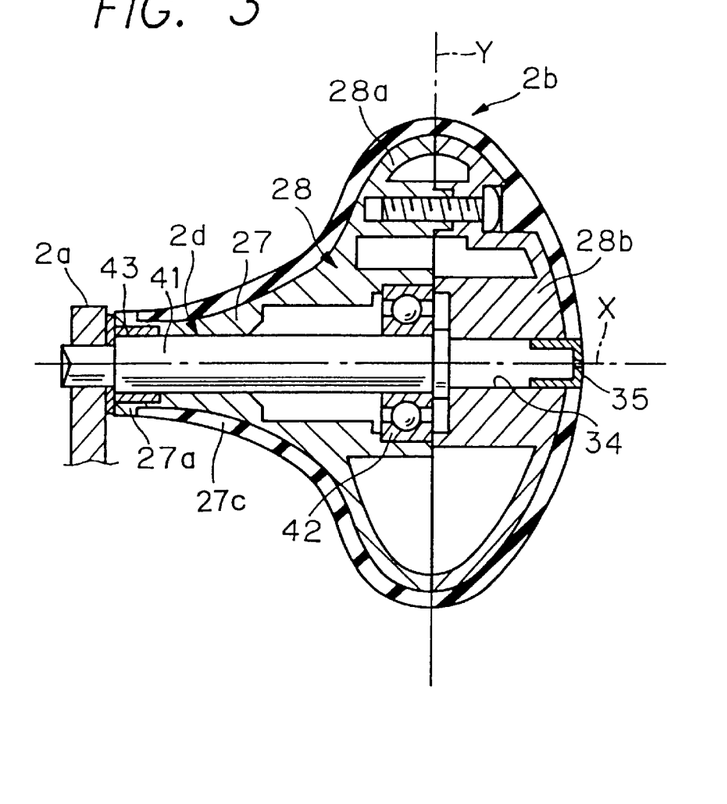
FIG. 3 is a magnified cross sectional view of the handle grip of FIG. 1.

The linking member 27 comprises a tubular section 27a continuing from the basal end 27b, and taking up 0% to about 70% of the overall length of the linking member, and a flaring section 27c continuing from the tubular section 27a, and gradually widening to the knob member 28.

Figure 4:
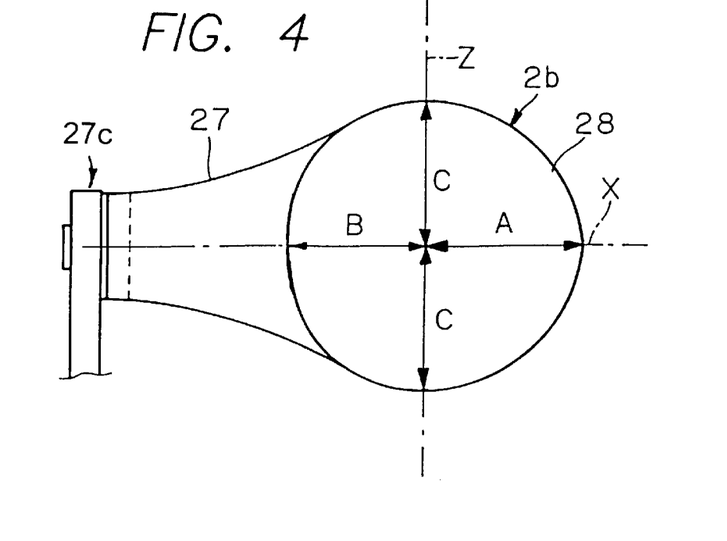
FIG. 4 is a frontal view of the handle grip of FIG. 1.

The exemplary knob member 28 is, as shown in FIG. 4, defines a first axis X, a second axis Y and a third axis Z that are mutually perpendicular and meet at a point of intersection. The exemplary knob member 28 is a synthetic resin component having a substantially circular section intersecting the second axis Y, and comprises an interior section 28a integrally formed with the linking member 27, and an exterior section 28b screwed onto the inner side section 28. A "substantially circular" cross section, as employed herein, denotes a cross section that is circular or deviates only slightly from circular, and includes closed curves such as circles, low-eccentricity ellipses, ovals, and other similar geometric configurations, as well as similar configurations having flattened portions. Preferred substantially circular cross sections include closed curves formed from two or more sections of different curvature, such as adjacent half ellipses, and more generally, cross sections that are asymmetric in the X-Z plane about the Z axis. The substantially circular section of the knob member 28, as shown in FIG. 4, is comprised of two adjacent half ellipses having a common major axis C—C, with different semi-minor axes A and B. The illustrated cross section decreases in size in proportion to its proximity to the two ends of the second axis Y away from the center, while the length A along the first axis X in the direction away from the point of intersection of the axes, i.e., away from the crank arm 2a, as shown in FIG. 4, is greater than the length B along the first axis X from the point of intersection in the direction of the crank arm. Furthermore, the length C intersecting the first axis X and the second axis Y in the direction of the third axis Z is greater than the length B.

Where the cross section is not elliptical or circular, the length B can be determined by the following procedure. First, a cross section in the plane of the first and second axes (i.e., the X-Y plane) is determined. Next, a curve that extends between the two ends of the cross section that intersect the second axis Y and follows at least a portion of the inner contour of the cross section is defined. This curve is a continuous curve that has no points of inflection, i.e., does not change from positive to negative curvature at any point. This curve thus will depart from the cross section where the cross section has a point of inflection. The distance from the point of intersection of the first, second and third axes to the point at which the curve intersects the first axis is equal to length B. See FIG. 5. This procedure is useful in determining length B when the linking member includes a flaring section and forms a single unit together with the knob member.

Figure 5:
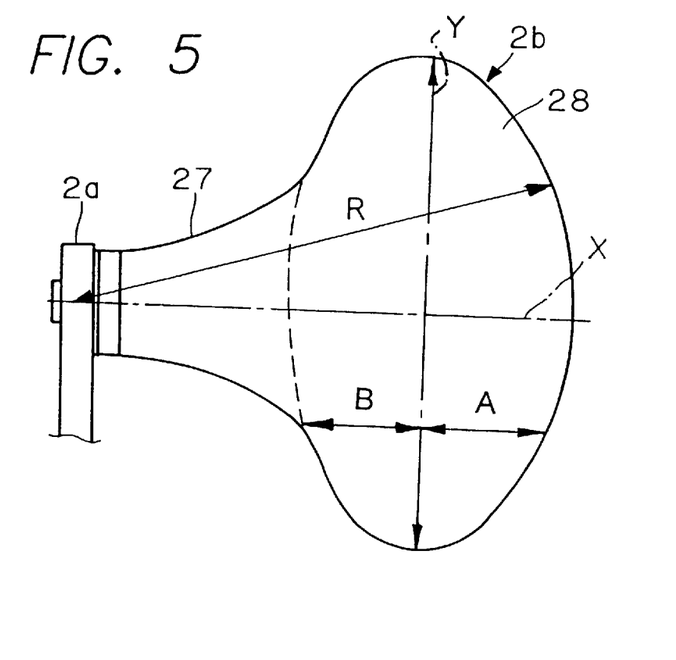
FIG. 5 is a plan view of the handle grip of FIG. 1.
Figure 6:
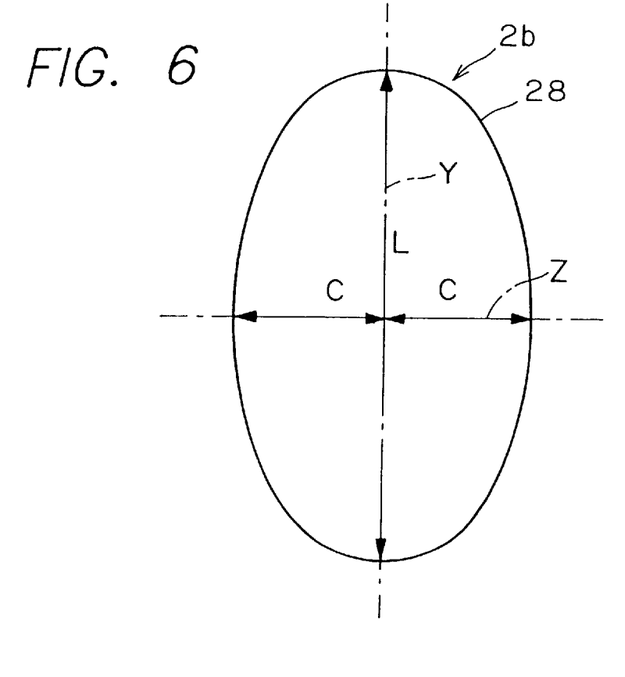
FIG. 6 is a side view of the handle grip of FIG. 1.

The external contour 28b of the exemplary knob member 28 in the plane of the first axis X and the second axis Y is, as shown in FIG. 5, arcuate, having a radius R, centered on the first axis X at the basal end of the knob member. Furthermore, the length L of the knob member 28 along the second axis Y preferably falls within the range of about 40 mm to about 100 mm, and preferably 50 mm to 80 mm. By setting the length L within such a range, the width of the standard human palm is matched, and it is possible to deliver full force. In addition, as shown in FIG. 6, the doubled value of the length C of the knob member 28 is about 50% to about 90% of the length L of the knob member 28 along the second axis Y, and the value obtained by adding the length A and the length B is also about 50% to about 90% of the length L of the second axis Y.

The cover section 29 preferably is made of a soft, elastic material such as Actimer® and the like, and is preferably formed in two layers integrated with the handle grip 2b. The cover section 29 preferably covers the entire surface of the linking member 27 and the knob member 28, and at least the outer portion of the knob member 28 (e.g., substantially the portion outward from the plane defined by the second axis Y and the third axis Z). By providing this cover 29, since the handle grip 2b is covered by a soft, elastic material, slipping is prevented, a good sensation is imparted when gripped, stronger, easier gripping is made possible, and the hand does not tire easily.

As shown in FIG. 3, a continuous through-hole 34 is formed through the linking member 27 and the knob member 28, and the opening of this through-hole 34 is stopped by an oil injection cap 35.

The sectional shape of the knob member 28 of the handle grip 2b formed in this way is designed so that the lengths A and C of the exterior (farther away from the crank arm 2a along the first axis X and toward the third axis Z which it intersects) are larger than the length B of the interior (closer to the crank arm along the first axis X), and is narrow at the two ends of the second axis Y than at the center. Thus, when it is gripped, the part of the knob member 28 touching the palm fits the shape of the palm, and there is no force lost even if the knob member 28 is gripped loosely. Due to this, it is possible to rotate the handle assembly 2 with force even when gripping it loosely, and the hand does not tire easily from long hours of repetitive high-speed knob member winding.

In addition, because the external contour 28b of the knob member 28 is arcuate, having a radius R, the knob member 28 fits the palm more comfortably. Furthermore, because the doubled value of the length C of the knob member 28 is 50%–90% of the length L of the knob member 28 along the second axis Y, and the value obtained by adding the length A and the length B is also 50%–90% of the length L along the second axis Y, the length of the knob member 28 in the first axis X and the third axis Z directions increases. Since it takes on an overall roundness of shape, it is easy to grip the knob member 28 instantaneously.

In addition, in the illustrated embodiment the linking member 27 has a tubular section 27a taking up 0%–70% of the total length and a flaring section 27b that gradually flares outward from the linking member 27. Due to this, the linking member 27 continues smoothly via the tubular section 27a to the knob member 28, so that there is no longer any boundary between the knob member 28 and the linking member 27 when gripping the knob member 28. This allows a good sensation to be imparted to the hand of the user no matter where it is gripped.

Furthermore, when the handle grip 2b is made from synthetic resin containing voids, it is possible to design a more lightweight model.

The knob member support member 2d comprises a grip shaft 41 secured at the distal end of the crank arm 2a, and extending along the first axis X first bearing 42 disposed between the distal end of the grip shaft 41 and the interior of the knob member 28, and second axis bearing 43 disposed between the basal end of the grip shaft 41 and the basal end of the linking member 27. The first axis bearing is, for example, a roller bearing, while the second axis bearing 43 is, for example, a slide bearing containing a lubricant. In this case, by using a slide bearing for the second bearing 43, it is possible to reduce the outer diameter of the linking member 27.

The basal end of the grip shaft 41 is caulked to the distal end of the crank arm 2a. In the knob member support member 2d, since the handle grip 2b is supported by the two bearings 42 and 43, the handle grip 2b rotates smoothly even during high-speed rotation of the handle shaft 30 by the handle grip 2b, making high-speed take-up easy.

As shown in FIG. 2, a spool 15 is rotatably disposed between the pair of side plates 10 and 11. A level wind mechanism 16 for evenly winding the fishing line is disposed between the pair of side plates 10 and 11, and next to the spool 15.

A first rotation transmission mechanism 20 for delivering torque to the spool 15 from the handle assembly 2, and a clutch mechanism 21 provided within the first rotation transmission mechanism 20, are disposed within the second cover 14 and outside the side plate 11. The first rotation transmission mechanism 20 contains a rotation control structure 22 for regulating torque when torque is delivered in reverse from the spool 15 to the handle assembly 2. In addition, a centrifugal brake system 23 for controlling the spool 15, which freely rotates in the direction letting out the line, is disposed in the center of the side plate 10, and a second rotation transmission mechanism 24 for delivering the rotations of the spool 15 to the level wind mechanism 16 is disposed within the first cover 13, and outside the side plate 10.

A spool shaft 25 is fixed in the center of the spool 15. The spool shaft 25 is rotatably supported by the covers 13 and 14 via the shaft bearings 26.

The first rotation transmission mechanism 20 comprises a handle shaft 30 fixed at one end thereof to the handle assembly 2; a main gear 31 connected to one end of the handle shaft 30 via the rotation control structure 22; and a pinion gear 32 that meshes with the main gear 31.

The handle shaft 30 is disposed parallel to the spool shaft 25, and one end thereof is rotatably supported by the side plate 11. It is possible to link the main gear 31 to one end of the handle shaft 30 through the rotation control structure 22 so that the two former elements do not undergo relative rotation. Under such a constitution, the torque from the handle assembly 2 can be directly delivered to the spool 15 when the clutch mechanism 21 is turned on.

The clutch mechanism 21 comprises a tubular pinion gear 32 slidably attached to the perimeter of the spool shaft 25; an engaging groove 32a disposed along part of the pinion gear 32; and a pin 33 disposed on the spool shaft 25. By causing the pinion gear 32 to slide along the spool shaft 25, so that the engaging groove 32a is engaged by the pin 33, knob member power is delivered from the spool shaft 25 and the pinion gear 32. This condition is called "clutch in." With the engaging groove 32a and the pin 33 disengaged, no knob member power is delivered from the spool shaft 25 and the pinion gear 32. This condition is called "clutch out." With the clutch out, the spool 15 rotates freely. The pinion gear 32 is urged towards the direction in which the engaging groove 32a and the pin 33 engage, that is to say, clutch in mode, by means of an urging means (not shown). This clutch mechanism 21 is operated to take out the clutch by the clutch lever 6 (FIG. 1) protruding diagonally upward from the back section of the second cover 14.

The rotation control structure 22 comprises a roller-type one-way clutch mechanism 40, which allows the handle shaft 30 to rotate only in the direction of the line take-up; a drag mechanism 50 for applying a set level of braking force in opposition to rotation in the direction of the line draw of the spool; and a pawl-type ratchet mechanism 60 for allowing the handle shaft 30 to rotate only in the direction of line take-up.

To prevent the reversal of the handle shaft 30 (rotational in the direction of the line let out) it is possible to provide only the ratchet mechanism 60, omitting the one-way clutch mechanism 40. However, it takes considerable time for the ratchet mechanism 60 to execute the motions of engaging and disengaging its ratchet pawl from the ratchet teeth. In order to execute the swift, smooth reversal prevention motion required of fishing, it is preferable to use the aforementioned one-way clutch mechanism 40, and effective to impose on the ratchet mechanism 60 any excessive force which the one-way clutch mechanism is unable to handle.

Following is a description of the reel motion during use of the fishing reel. When releasing the fishing line, the clutch mechanism 21 is switched off by the clutch lever 6. This allows the spool 15 to rotate freely in the direction of the line release, drawn out due to the weight of the jig, so that the fishing line is released from the spool 15. When the jig reaches the ocean floor, the handle assembly 2 is rotated in the direction of the line retrieval, and vertical jigging begins. When the handle shaft 2 begins rotating in the direction of the line retrieval, it is switched to clutch in mode by the clutch return mechanism (not shown).

During vertical jigging, the back end (not shown) of the fishing rod F is held between the left arm and side, the thumb of the left hand H is placed on the thumb rest 17 fixed on the back of the reel body 1, the fishing rod F is held with the reel by the other fingers, the fishing rod F is jerked by the left hand, while the right hand grasps the handle grip 2b of the handle assembly 2, and high-speed rotation of the handle shaft 30 is repeated.

When the handle assembly 2 is rotated in the direction of the line retrieval , the rotation of the handle assembly 2 is transmitted directly from the handle shaft 30 of the handle assembly 2 to the main gear 31 via the one-way clutch mechanism 40 and the drag mechanism 50. Since the clutch mechanism 21 is on during this time, the rotation of the main gear 31 is transmitted from the pinion gear 32 to the spool 15, and the fishing line is reeled in. Because rotation at this time is in the direction of line retrieval at this time, it is permitted by the one-way clutch mechanism 40 and the ratchet mechanism 60.

Because the knob member 28 of the handle grip 2b is molded into the aforementioned form, the outer side section 28 of the knob member 28 which comes into contact with the palm fits the shape of the palm when gripped, and allows high- speed rotation with sufficient force even if the knob member 28 is gripped loosely.

Next, when the fishing line is reeled out, for example, by being pulled by a fish, the rotation of the spool 15 is transmitted to the main gear 31, and on to the handle shaft 30 and the one-way clutch mechanism 40 via the drag mechanism 50. The reverse rotation of the handle shaft 30 is stopped by the one-way clutch mechanism 40. If the pull of the fish proves to be weak, the spool 15 does not rotate and the fishing line is not let out. When the pull of the fish grows stronger and the rotation of the spool 15 increases, the transmitted rotational power exceeds the set rotation resistance of the drag mechanism 50, whereupon the drag mechanism begins to slip, and the spool 15 side containing the main gear 31 begins to rotate. During this time, resistance, that is to say, dragging force from the drag mechanism 50 is constantly applied to the spool 15.

Figure 7:
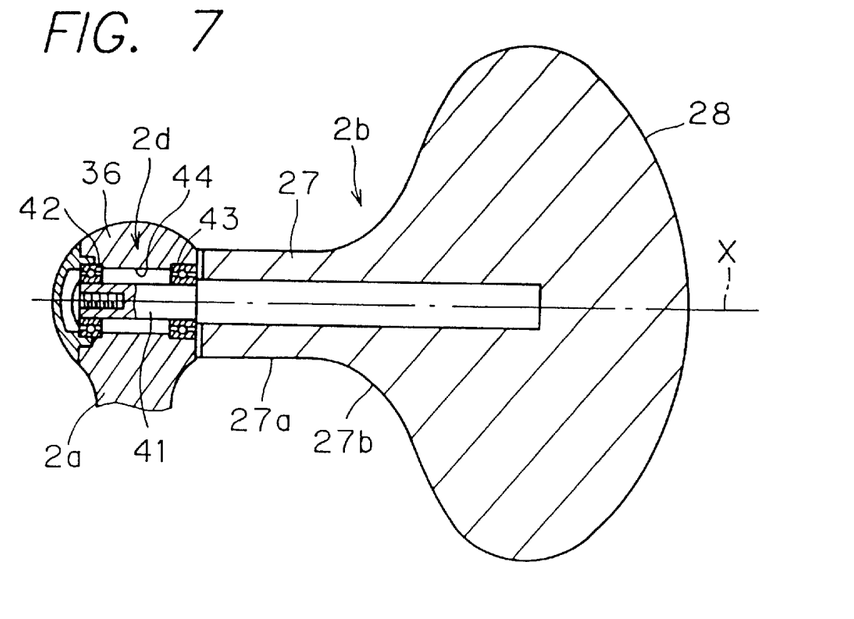
FIG. 7 is a cross sectional view of an alternative embodiment of the inventive handle grip.

As shown in FIG. 7, it is possible to provide a knob member support member 2d on the distal end of the crank arm 2a. This knob member support member 2d includes a handle grip 2b comprising, for example, a grip shaft 41 fixed by insert molding, and first and second axis bearings 42 and 43 which rotatably support the grip shaft 41. The two bearings 42 and 43 are both roller bearings. A spherical section 36 is formed on the distal end of the crank arm 2a, on which there is a through-hole 44 along the first axis X. There are two roller bearings 42 and 43 on both sides of this through-hole 44. No cover sections are provided in this embodiment. When no cover sections are provided, the handle grip 2b can be made entirely of a soft elastic material.

In an alternative embodiment, shaft 41 can be formed as part of a one-piece unit that includes knob member 27. That is, the knob member is a solid element having a projecting shaft portion. In this embodiment, section 27a of knob member 27 is a cylindrical section rather than a tubular section.

The instant invention also provides a handle grip which is useful with a variety of handle assemblies. The handle grip includes a linking member and a knob member. The linking member can be a tubular section, with or without a flaring section, and can be an element that is separate from the knob member or part of a single unit which includes both the linking member and the knob member. The knob member preferably has at least a smooth outer surface, with which the palm of the user comes into contact, and defines first, second and third mutually perpendicular axes meeting at a point of intersection. The knob member has a substantially circular cross section in each plane perpendicular to the second axis, on either side of the point of intersection. The cross sections decrease in size outward from the point of intersection along the second axis.

Figure 10:
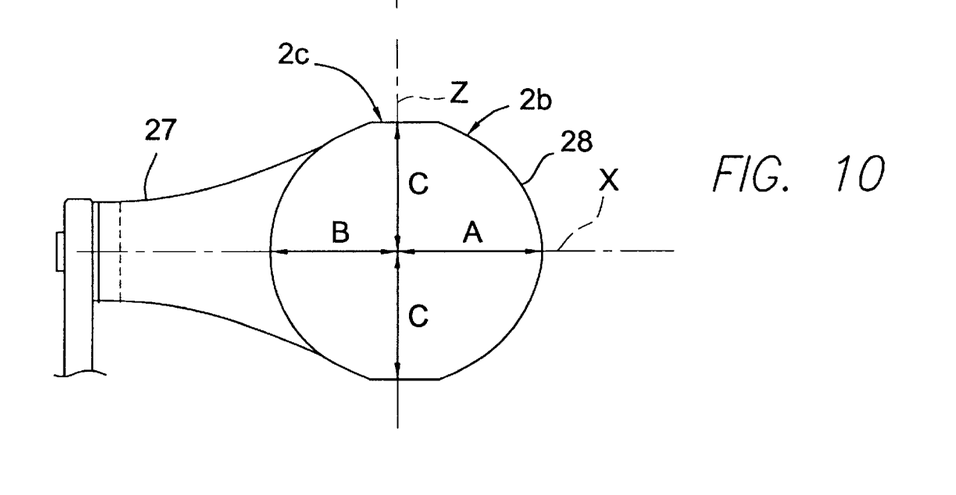
FIG. 10 is a cross sectional view of an additional embodiment of the inventive handle grip having a substantially circular cross section which includes linear segments.

These substantially circular cross sections again can be defined by circles, ellipses, ovals or other similar closed curves, which can also include one or more straight segments, such as section 2c shown in FIG. 10. Preferably, if straight sections are used, the transitions between the straight and curved sections are blunt or rounded, in order to increase comfort to the user.

Preferably, the first axis lies in a plane of symmetry of the grip, such that cross sections are identical on either side thereof.

More generally, the instant invention provides a handle grip that includes a linking member and a knob member. The knob member has at least a smooth outer surface and defines first, second and third axes as described above. Preferably, the linking member extends along the first axis. The knob member has a cross section in each plane perpendicular to the second axis that is bounded by at least a portion of a curve selected from the group consisting of a conic section (i.e., circles, ellipses, parabolas and hyperbolas) and an oval. The curved portions define at least a portion of the smooth outer surface. The cross sections decrease in area outward along the second axis on either side of the point of intersection of the three axes, reducing to zero at the point of intersection of the outer surface of the knob member with the second axis.

Preferably, the cross sections are geometrically similar, that is, differ only by a scale factor. In the alternative, the cross sections can vary in geometric configuration outward along the second axis, either symmetrically or asymmetrically. In the former alternative, the knob element can possess a plane of symmetry within which the first axis lies. Symmetrical configurations afford increased comfort to the user.

Figure 8:
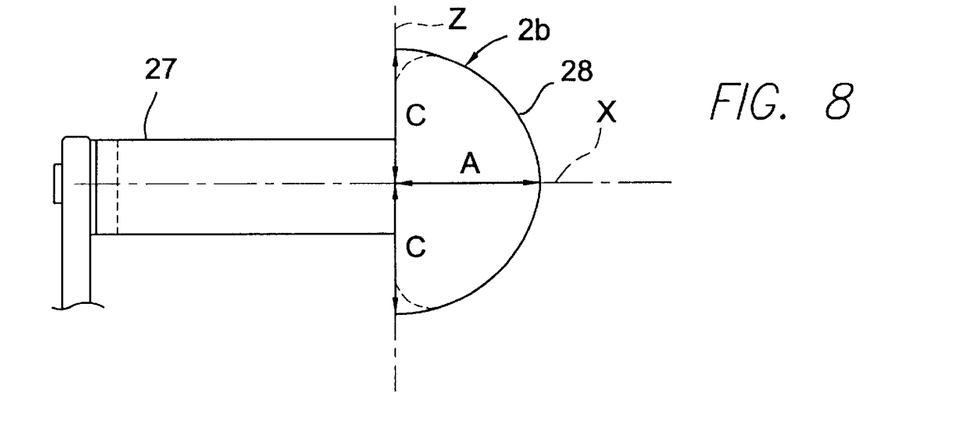
FIG. 8 is a cross sectional view of another embodiment of the inventive handle grip having a semicircular or half elliptical cross section, with alternative blunt corners shown as dashed lines.

The cross sections can have a wide range of configurations. Useful cross sections include, without limitation, circles, ellipses, ovals, substantially circular or elliptical cross sections (i.e., cross sections which deviate to a small degree from perfect circles or ellipses by having, for example, straight portions), as well as composite configurations such as adjacent half ellipses sharing a common major axis as described above and illustrated in FIG. 4. Other configurations within the scope of the invention include semicircles, as illustrated in FIG. 8 (with lengths A and C being equal) and half ellipses. Such cross sections can have straight sides, as shown in FIG. 8. In a preferred alternative embodiment, the straight and curved portions of the cross sections meet, not at sharp angles, but in blunt or curved sections in order to afford increased comfort to the user. For example, blunt sections 2f are shown as dashed lines in FIG. 8.

Figure 9:
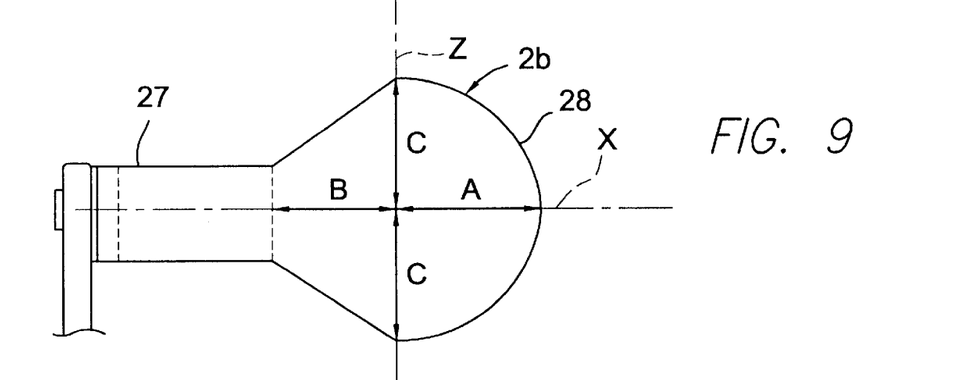
FIG. 9 is a cross sectional view of a further embodiment of the inventive handle grip having a composite cross section including substantially circular and trapezoidal portions.

Other alternative cross sectional configurations include combinations of portions of circles, ellipses, etc. and portions defined by straight edges, such as triangles or trapezoids (see FIG. 9). Again, the straight and curved portions preferably are connected by blunt or curved portions to afford increased user comfort.

Figure 11:
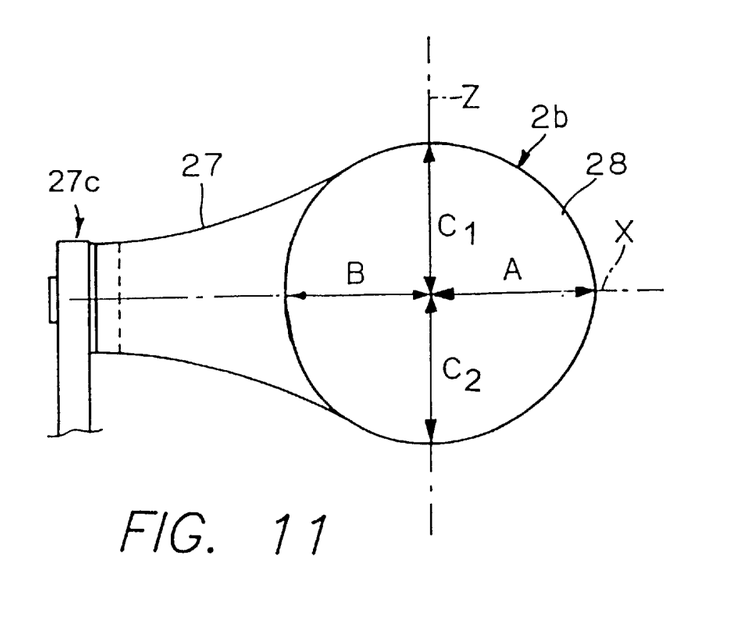
FIG. 11 is a cross sectional view of a more general embodiment of the inventive handle grip having a substantially circular cross section.

A more general substantially circular cross section, shown in FIG. 11, defines lengths A, B, $C_1$ and $C_2$. Each of these lengths can be the same or different. When all lengths are the same, the cross section is a circle (all lengths being radii of the circle); when A=B and $C_1=C_2$, the cross section is an ellipse; when A±B and $C_1=C_2$, the cross section is as described in FIG. 4; and when each length is different, the cross section is an irregular but substantially circular cross section, deviating from true circularity as the various lengths differ to a greater or lesser extent.

The inventive handle grip thus generally includes a knob member that has an outer surface that substantially conforms to the shape of a human palm.

Figure 12:
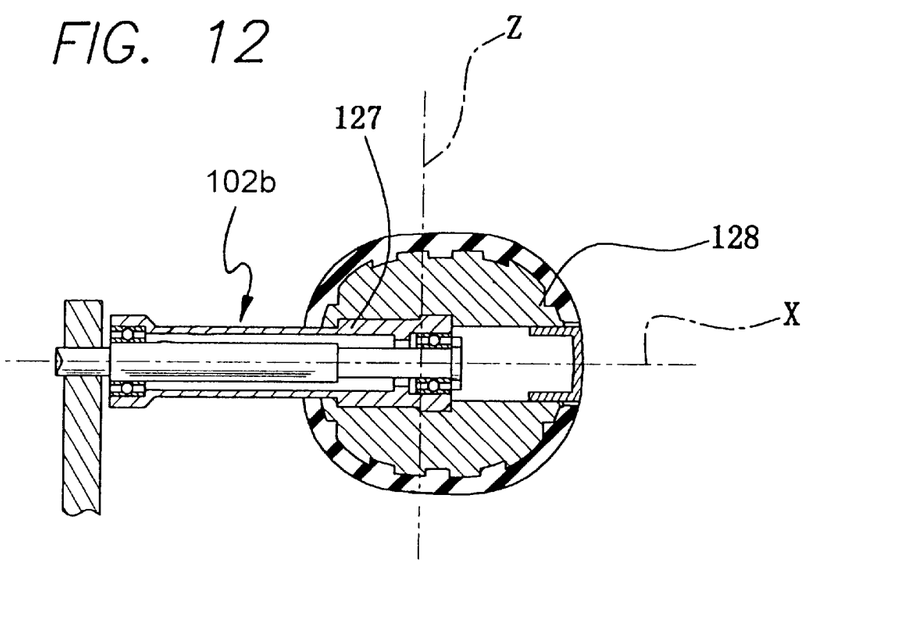
FIGS. 12 and 13 are a cross sectional and schematic view, respectively, of an alternative embodiment of a knob member having an oval cross section and a linking member having a tubular section without a flaring section.
Figure 13:
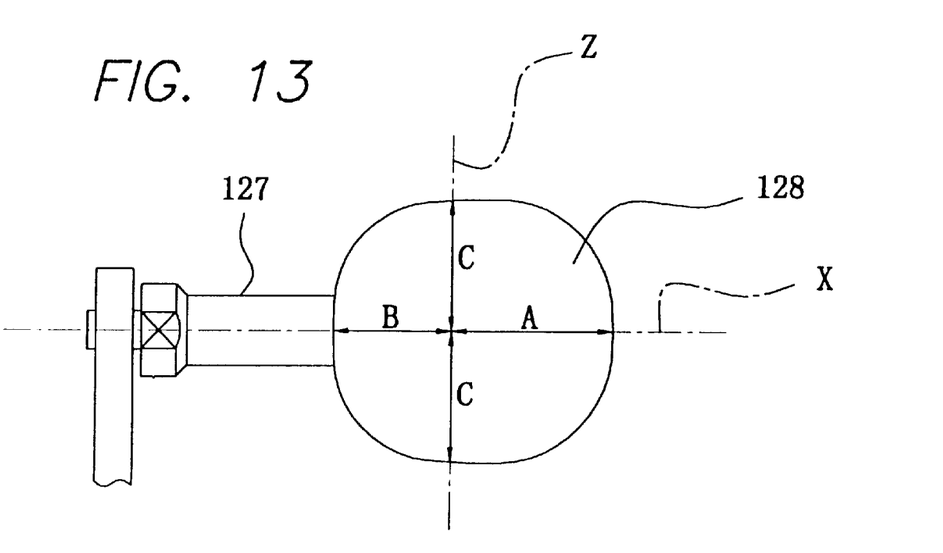

FIGS. 12 and 13 illustrate an alternative embodiment of a handle grip 102b having a knob member 128 with an oval cross section and a linking member 127 having a tubular section but no flaring section.

Figure 14:
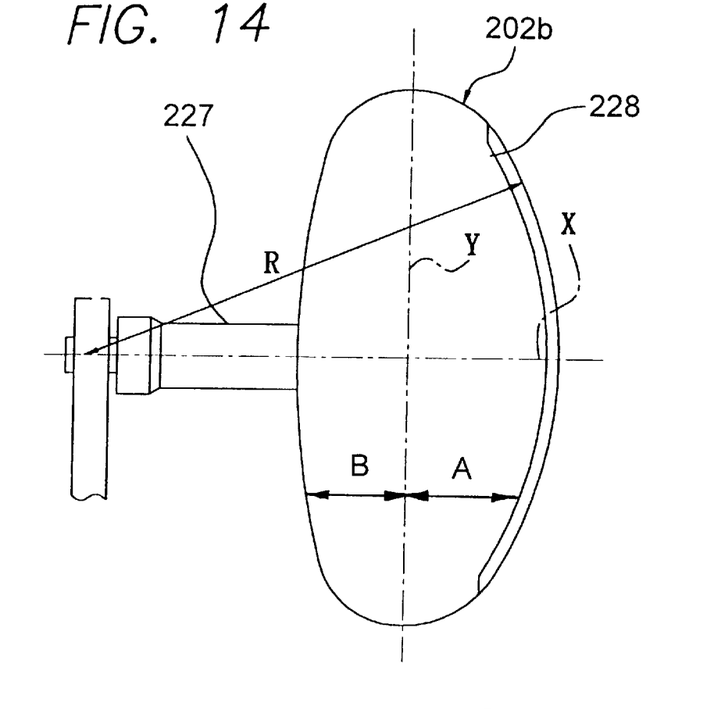
FIGS. 14 and 15 are a cross sectional and end view, respectively, of an alternative embodiment of a knob member having an asymmetric cross section, also with a linking member having a tubular section without a flaring section.
Figure 15:
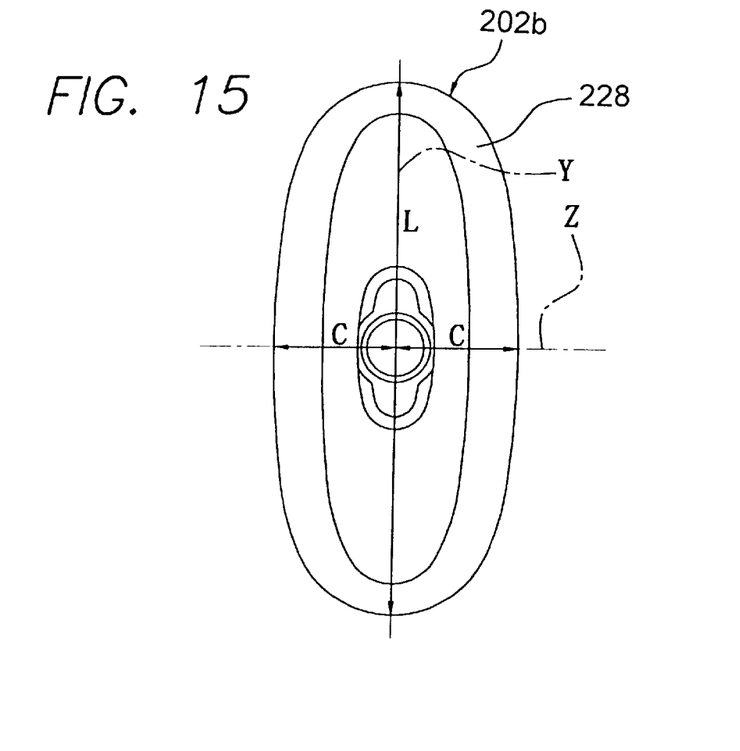

In FIGS. 14 and 15, another alternative embodiment of a handle grip 202b has an asymmetric knob member 228 with a tubular linking member 227.

Figure 16:
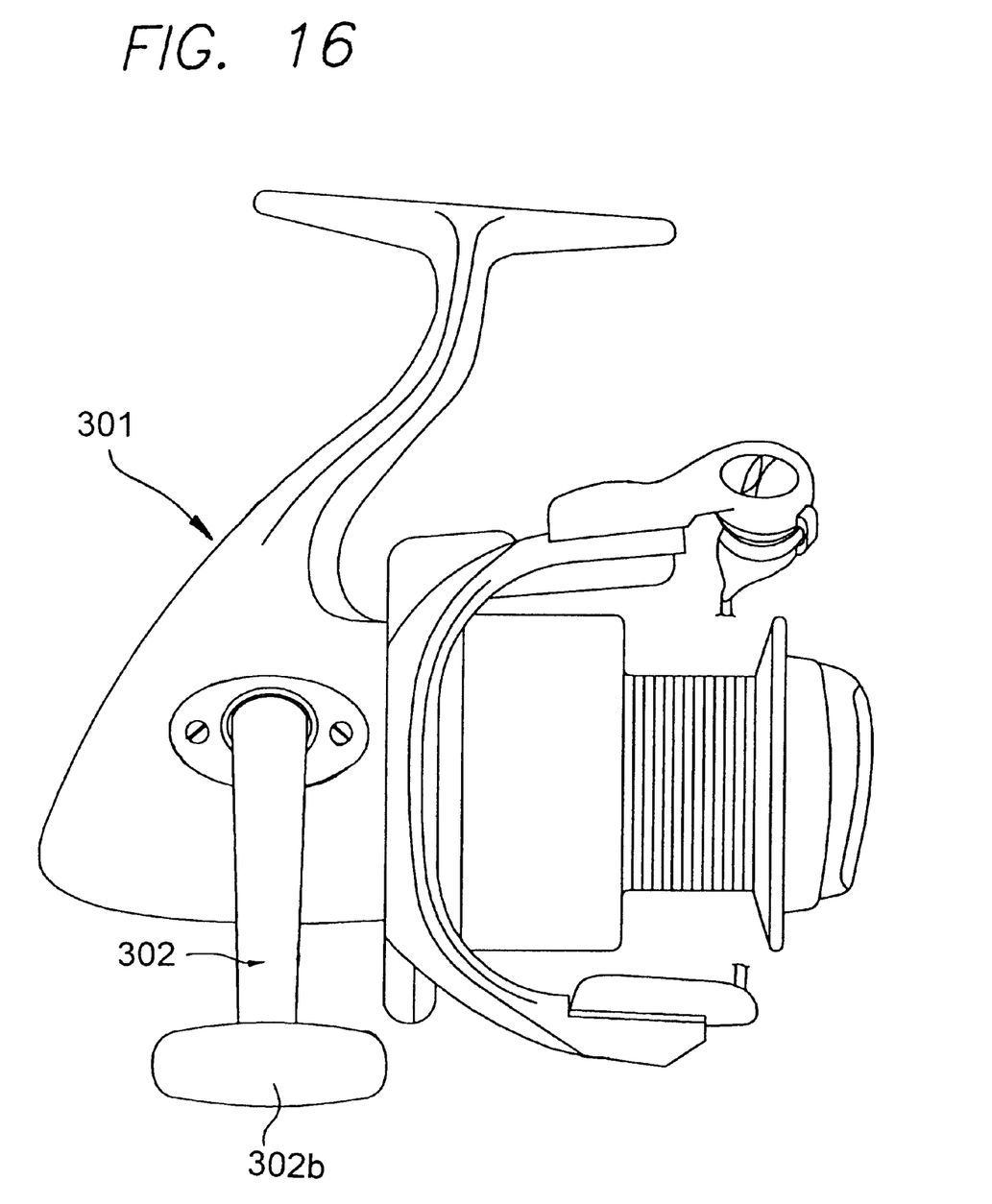
FIG. 16 is an illustration of a spinning reel including a handle assembly according to the invention.

In the aforementioned embodiments, the handle assembly of the present invention was attached to the round double-bearing reel, but this handle assembly of the present invention can be applied to other embodiments of all varieties of fishing reels, such as double bearing reels, spinning reels, single bearing reels and the like. In particular, the crank arm need not be a flat element that is perpendicular to the handle shaft, but can also be an angled element that extends outwardly from the handle shaft at an oblique angle on one or both sides of the handle shaft. Such embodiments are useful, for example, in spinning reels. For example, in FIG. 16 a spinning reel includes a reel body 301 and an obliquely angled handle assembly 302 with a knob member 302b as described herein. In addition, it may be applied to a crank arm having a handle grip on both sides.

What is claimed is:

1. A handle assembly adapted to be attached to a distal end of a handle shaft of a fishing reel, said handle assembly comprising (a) a crank arm which is nonrotatably attachable to said distal end of said handle shaft and extends outwardly from said handle shaft, said crank arm having a distal end, and (b) a handle grip having an outer surface and comprising (i) a linking member connected to said distal end of said crank arm and mounted rotatably about a first axis that is parallel to said handle shaft, said linking member projecting along said first axis from said distal end of said crank arm, said linking member having a basal end and a distal end, and (ii) a knob member having a substantially circular cross section, said knob member extending from said distal end of said linking member in both directions along a second axis that intersects said first axis and is perpendicular to said handle shaft, wherein (i) said substantially circular cross section of said knob member decreases in radial size measured from said second axis proceeding outward from the point of intersection of said first axis and said second axis, (ii) the length A of said knob member from said point of intersection along said first axis in the direction away from said crank arm is greater than the length B from said point of intersection along said first axis in the direction towards said crank arm, and (iii) the lengths C of said knob member from said point of intersection in each direction along a third axis that intersects and is perpendicular to said first axis and said second axis are greater than said length B.

2. A handle assembly for a fishing reel as claimed in claim 1 wherein said knob member has an outer side portion having a contour that is arcuate in shape and has a radius centered on said first axis and extending in the plane defined by said first and second axes.

3. A handle assembly for a fishing reel as claimed in claim 1 wherein the length L of said knob member along said second axis is about 40 mm to about 100 mm.

4. A handle assembly for a fishing reel as claimed in claim 1 wherein the sum of said length A and said length B of said knob member is equal to about 50% to about 90% of the length L of said knob member along said second axis.

5. A handle assembly for a fishing reel as claimed in claim 3 wherein the value obtained by doubling said length C of said knob member is equal to about 50% to about 90% of said length L.

6. A handle assembly for a fishing reel as claimed in claim 1 wherein said linking member has an overall length and comprises (i) a tubular section comprising 0%–70% of said overall length of said linking member and extending from said basal end, and (ii) a flaring section continuous with said tubular section and gradually flaring outward to join with said knob member.

7. A handle assembly for a fishing reel as claimed in claim 1 wherein the outer surface of at least said knob member of said handle grip is covered with a soft, elastic material.

8. A handle assembly for a fishing reel as claimed in claim 1 further comprising (c) a knob member support member for rotatable mounting of the handle shaft to the crank arm.

9. A handle assembly for a fishing reel as claimed in claim 8 wherein said knob member support member comprises (i) a grip shaft fixed at the basal end thereof to the distal end of the crank arm and extending along the first axis, (ii) a first bearing disposed between said distal end of said grip shaft and an inner side of said knob member, and (iii) a second bearing disposed between said basal end of said grip shaft and said basal end of said linking member.

10. A handle grip comprising (a) a linking member, and (b) a knob member having a smooth outer surface, said knob member defining first, second and third mutually perpendicular axes that meet at a point of intersection, said knob member having a substantially circular cross section in each plane perpendicular to said second axis, said substantially circular cross sections decreasing in size outward from said point of intersection along said second axis in either direction, wherein the length A of said knob member from said point of intersection outward along said first axis is greater than the length B of said knob member from said point of intersection inward along said first axis.

11. A handle grip as claimed in claim 10 wherein the length C of said knob member from said point of intersection along said third axis greater than said length B.

12. A handle grip as claimed in claim 10 wherein said first axis lies in a plane of symmetry.

13. A handle grip as claimed in claim 10 wherein said linking member has a basal end, and wherein said smooth outer surface of said knob member has a radius R extending from the point of intersection of said first axis and said basal end in the plane defined by said first and second axes.

14. A handle grip as claimed in claim 10 wherein the length L from said point of intersection along said second axis is about 40 mm to about 100 mm.

15. A handle grip as claimed in claim 10 wherein the sum of said length A and said length B is equal to about 50% to about 90% of the length L from said point of intersection along said second axis.

16. A handle grip as claimed in claim 15 wherein the value obtained by doubling the length C of said knob member from said point of intersection along said third axis is equal to about 50% to about 90% of said length L.

17. A handle grip as claimed in claim 10 in combination with a crank arm, whereby said handle grip and said crank arm form a handle assembly adapted to be attached to a distal end of a handle shaft of a fishing reel.

18. A handle grip comprising (a) a linking member, and (b) a knob member having a smooth outer surface, said knob member defining first, second and third axes, said first, second and third axes being mutually perpendicular and meeting at a point of intersection, wherein said knob member has a cross section in each plane perpendicular to said second axis that is bounded by at least a portion of a curve selected from the group consisting of a conic section and an oval, said portions defining at least a portion of said smooth outer surface, said cross sections having a length B from said point of intersection inward along said first axis and a length C from said point of intersection along said third axis which are different from each other, said cross-sections decreasing in area outward from said point of intersection along said second axis in either direction.

19. A handle grip as claimed in claim 18 wherein each said cross section is substantially circular.

20. A handle grip as claimed in claim 18 wherein each said cross section is substantially elliptical.

21. A handle grip as claimed in claim 18 wherein each said cross section is comprised of outer and inner half ellipses having a common major axis extending along said third axis a length C from said point of intersection in either direction, said outer half ellipse having a semi-minor axis extending along said first axis a length A from said point of intersection, said inner half ellipse having a semi-minor axis extending along said first axis a length B from said point of intersection.

22. A handle grip as claimed in claim 21 wherein length A is greater than length B.

23. A handle grip as claimed in claim 21 wherein length C is greater than length B.

24. A handle grip as claimed in claim 18 wherein said cross section is selected from the group consisting of a semicircle, a half ellipse or a half oval.

25. A handle grip as claimed in claim 18 wherein said cross section is comprised of an outer portion selected from the group consisting of a semicircle, a half ellipse and a half oval and an inner portion selected from the group consisting of a triangle and a trapezoid.

26. A handle grip as claimed in claim 18 wherein each said cross section is substantially circular, and wherein length A outward along said first axis from said point of intersection, length B inward along said first axis from said point of intersection, and lengths $C_1$ and $C_2$ along said third axis from said point of intersection in either direction, respectively, are the same or different.

27. A handle grip as claimed in claim 18 wherein said cross sections are geometrically similar.

28. A handle grip as claimed in claim 18 wherein said cross section includes at least one curved portion and at least one straight portion.

29. A handle grip as claimed in claim 18 wherein said linking member has a basal end, and wherein said smooth outer surface of said knob member has a radius R extending from the point of intersection of said first axis and said basal end in the plane defined by said first and second axes.

30. A handle grip as claimed in claim 18 wherein said linking member is substantially tubular along substantially its entire length.

31. A handle grip as claimed in claim 18 wherein said linking member includes a tubular section and a flaring section that connects to said knob member.

32. A handle grip as claimed in claim 18 in combination with a crank arm, whereby said handle grip and said crank arm form a handle assembly adapted to be attached to a distal end of a handle shaft of a fishing reel.

* * * * *